Nov. 19, 1957 D. L. SPANJER 2,813,760
DETACHABLE TRACK ASSEMBLY
Filed June 28, 1954 2 Sheets-Sheet 1
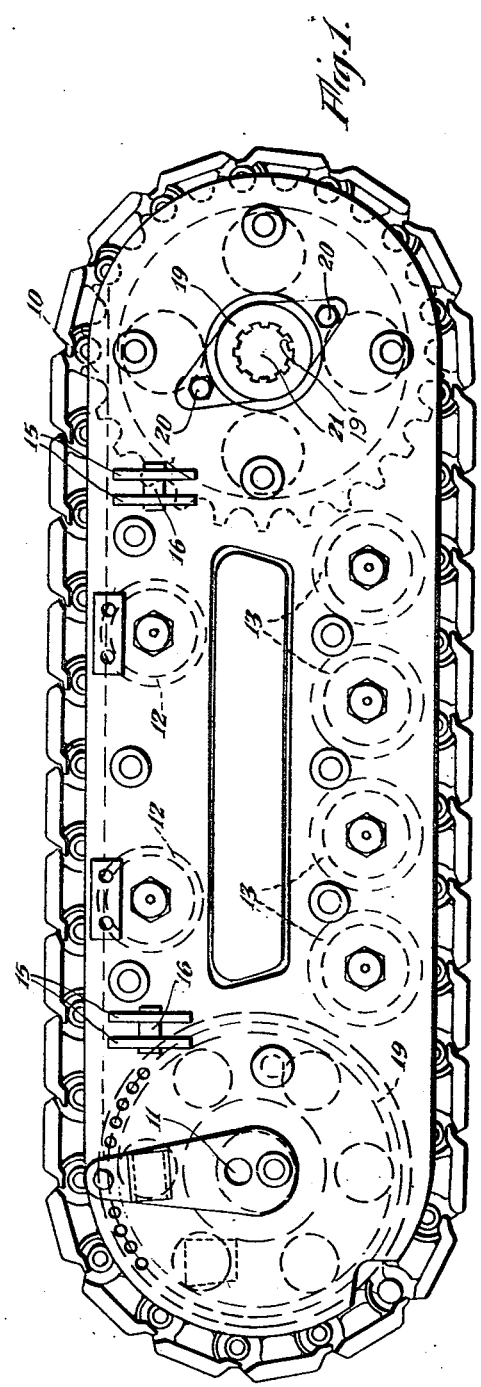
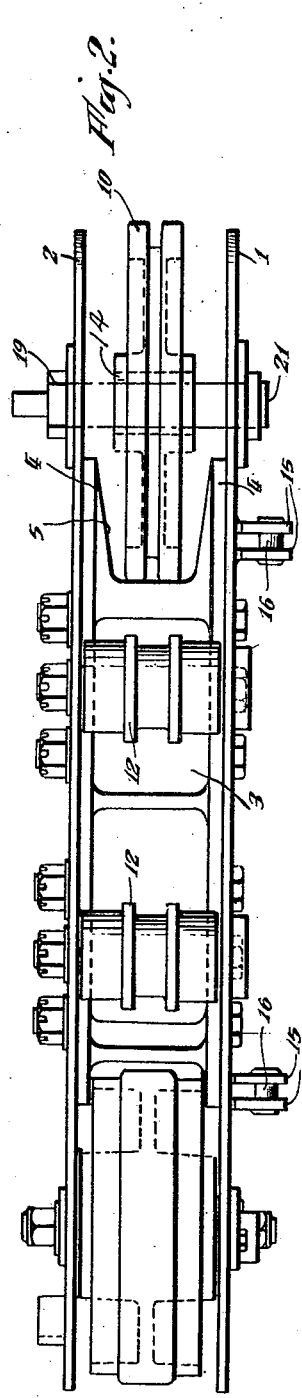
David L. Spanjer
By Harold T. Stowell
Attorney

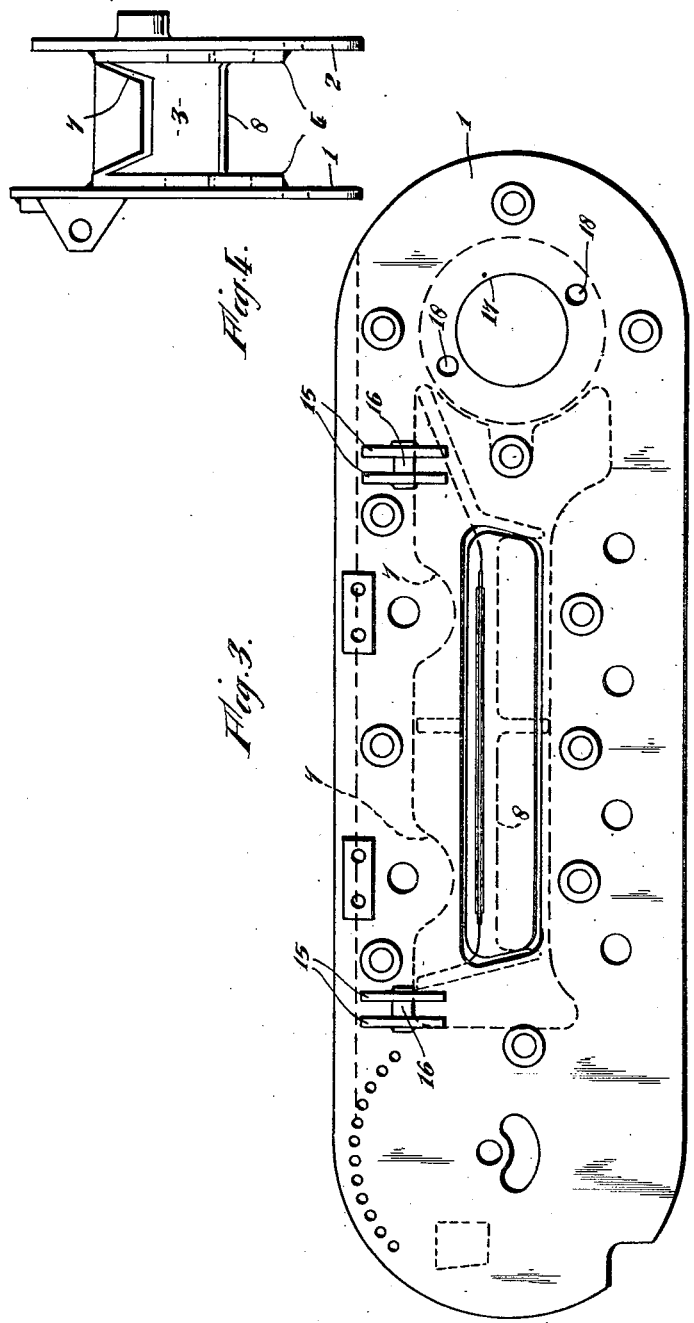

United States Patent Office 2,813,760
Patented Nov. 19, 1957

2,813,760

DETACHABLE TRACK ASSEMBLY

David Lucien Spanjer, Leeds, England, assignor to The Eimco Corporation, Salt Lake City, Utah, a corporation of Utah Application June 28, 1954, Serial No. 439,772

Claims priority, application Great Britain June 26, 1953

2 Claims. (Cl. 305—10)

This invention relates to endless tracks for machines or vehicles, and is particularly concerned with an improved endless track assemblage which is of particular utility in connection with mobile material-handling machines, such as overhead bucket loaders, conveyors, transporters, cranes or the like, as well as to mobile machines or vehicles of other kinds.

Endless track assemblages in such machines or vehicles are generally so constructed and mounted that the mounting or removal of an endless track from the machine or vehicle is a difficult operation.

The present invention has for its object to provide an improved endless track assemblage which can be readily applied to and removed from a machine or vehicle so that a faulty unit can be quickly replaced or more readily repaired and thereby reduce the period during which the machine or vehicle is out of commission.

According to the present invention, there is provided, in or for an endless track machine or vehicle, an endless track assemblage adapted for detachable mounting as a unit on the machine or vehicle, said assemblage comprising a pair of spaced side plates or side plate structures, a main track supporting idler wheel disposed between the side plates or structures at one end of the assemblage, secondary idler wheels disposed between the side plates or structures at the top and bottom of the assemblage, and a driving sprocket disposed between the side plates or structures at the other end of the assemblage and slidably engageable and disengageable with a driving axle of the machine or vehicle. The assemblage may include means, such as bushings, attached to the side plates or structures for supporting a temporary arbor for locating the driving axle in relation to the assemblage when the assemblage is removed from the machine or vehicle. The temporary arbor is adapted to form a continuation of the driving sprocket during mounting and dismounting of the assemblage. In operation of the device, where the sprocket 10 is maintained on the drive axle of the vehicle by a retaining nut, the retaining nut is first removed. The temporary arbor support flange or bushing 19 is attached to side plate 1 by bolts 20. The temporary arbor 21 is then slid into the bushing 19, and aligned therein by splines 19', until the inner end of the temporary arbor is in abutment with the outer end of the drive axle. The weight of the track frame is then supported by a block and tackle and the track frame is levered away from the body of the vehicle. The sprocket 10, during the levering procedure is slid from the drive axle and on to the temporary arbor 21 and at the same time the temporary arbor is pushed toward and into engagement with the other side plate, and bushing 19 for side plate 2 is then bolted into place.

To reassemble the unit the reverse procedure is employed. The side plates or side plate structures may be spaced apart by a substantially centrally disposed rigid member or structure to which the side plates or side plate structures are fixed. The centrally disposed member or structure may be flanged and recessed to accommodate the said driving sprocket and idler wheels. Eccentric track tension adjusting means may be associated with the main idler wheel.

The invention is hereinafter described, by way of example, with reference to the accompanying diagrammatic drawings, in which:

Fig. 1 is a side elevation illustrating a construction of endless track assemblage according to the invention;

Fig. 2 is a top plan view corresponding to Fig. 1;

Fig. 3 is a side elevation of the structure with the driving sprocket, idler wheels and track removed; and Fig. 4 is an end elevation corresponding to Fig. 3.

In carrying the invention into effect according to one embodiment, and as illustrated in the accompanying diagrammatic drawings, an endless track assemblage according to the invention comprises a pair of side plates 1, 2, or side plate structures, spaced apart by means of a substantially centrally disposed rigid member or structure 3 to which the side plates 1, 2 are secured as by welding or by means of bolts (not shown). The member or structure 3 is preferably formed with side flanges 4 and is recessed as at 5 and 6, Fig. 2, and at 7 and 8, Fig. 3, to provide working clearance for the driving sprocket 10, the main idler wheel 9, upper idler wheels 12 and lower idler wheels 13, all disposed between the side plates 1, 2, the driving sprocket 10 being at one end of the assemblage and the main idler wheel 9 at the other end thereof.

The main idler wheel 9 is mounted on a suitable bearing assemblage (not shown) carried by an eccentrically disposed pin 11 mounted in the side plates 1, 2 whereby the tension of the track may be readily adjusted. The particular construction of the eccentric adjustment means shown in the drawings forms no part of the present invention and is disclosed and claimed in my copending application Serial No. 439,773, filed June 28, 1954, now Patent 2,774,638 issued December 18, 1956.

The driving sprocket 10 is provided with an internally splined boss 14 which is slidably engageable and disengageable with a driving shaft of the machine or vehicle in connection with which the endless track assemblage is used. For facilitating mounting or removal of the assemblage, pairs of lugs 15 carrying pins 16 may be provided on the outermost side plate 1 for the attachment of temporary supporting arms or the like.

Each side plate 1, 2 is provided with an aperture 17 and a temporary bushing 19 having splines 19' is attachable to the side plate by means of bolts 20 engaging holes 18 in the side plates, the bushings 19 serving for the support of a temporary arbor 21 by which the driving sprocket 10 is positioned in the assemblage when said assemblage is removed from the machine or vehicle.

It will be understood that the invention is not limited to the particular embodiment hereinbefore described. For example, the side plates 1, 2 and centrally disposed member or structure 3 may be formed as one casting suitably machined where required.

What I claim is:

1. An endless track assemblage, adapted for detachable mounting as a ground engaging unit for a vehicle comprising paired spaced side plates cooperating to form the main frame of the endless track assemblage, a main endless track idler wheel mounted for rotation between said side plates at one end thereof, an endless track drive sprocket removably carried by the vehicle axle between and at the other end of said side plates, secondary idler wheels mounted for rotation along the longitudinal side edges of said plates between said main endless track idler and said drive sprocket and means for supporting said drive sprocket in driving relation to said main idler wheel when the endless track assemblage is removed from a vehicle said means comprising bushings carried by the side plates in alignment with the axis of rotation of the drive sprocket, and a temporary arbor carried by said bushing for locating and supporting the drive sprocket in driving relation to the assemblage when the assemblage is removed from a vehicle.

2. The invention defined in claim 1 wherein the drive sprocket and the bushings carried by the side plates are provided with matched internal splines to receive the temporary arbor.

References Cited in the file of this patent
UNITED STATES PATENTS

| | | |
|---|---|---|
| 2,668,738 | Przyblski | Feb. 9, 1954 |
| 2,681,231 | Kondracki | June 15, 1954 |